(12) United States Patent
Klukowski (10) Patent No.: US 8,497,593 B2
(45) Date of Patent: Jul. 30, 2013

(54) DEVICE FOR COLLECTING SWELL ENERGY

(76) Inventor: Slawomir Klukowski, Paris (FR)

( * ) Notice: Subject to any disclaimer, the term of this patent is extended or adjusted under 35 U.S.C. 154(b) by 290 days.

(21) Appl. No.: 12/866,659

(22) PCT Filed: Feb. 16, 2009

(86) PCT No.: PCT/FR2009/000166
§ 371 (c)(1),
(2), (4) Date: Aug. 6, 2010

(87) PCT Pub. No.: WO2009/115675
PCT Pub. Date: Sep. 24, 2009

(65) Prior Publication Data
US 2010/0320766 A1 Dec. 23, 2010

(30) Foreign Application Priority Data
Feb. 22, 2008 (FR) ........................ 08 00951

(51) Int. Cl.
*F03B 13/10* (2006.01)
*F03B 13/12* (2006.01)
*H02P 9/04* (2006.01)

(52) U.S. Cl.
USPC .............................................. 290/53

(58) Field of Classification Search
USPC .................................... 290/42, 43, 53, 54
See application file for complete search history.

(56) References Cited

U.S. PATENT DOCUMENTS

| 4,406,586 A | 9/1983 | De la Roche Kerandraon |
| 6,756,695 B2 * | 6/2004 | Hibbs et al. ................. 290/42 |

FOREIGN PATENT DOCUMENTS

| DE | 199 32 004 | 1/2001 |
| DK | 9 400 381 | 12/1994 |
| GB | 2 356 430 | 5/2001 |
| WO | WO 80/02181 | 10/1980 |
| WO | WO 03/014561 | 2/2003 |
| WO | WO 2004/065785 | 8/2004 |

OTHER PUBLICATIONS

UK Patent Application GB 2 356 430, Nov. 17, 1999.*
International Search Report for related international application No. PCT/FR2009/000166, report dated Sep. 17, 2009.

* cited by examiner

*Primary Examiner* — Javaid Nasri
(74) *Attorney, Agent, or Firm* — Miller, Matthias & Hull LLP (57) ABSTRACT

A device for collecting swell energy that comprises a float, a turbine mounted under the float and adapted for moving relative to the float when the float is moved by the swell, and a power generator driven by the turbine. The turbine is rotatingly mounted about a vertical rotation axis, so that a tilting motion of the float always results in a torque applied onto the turbine in a single predetermined rotation direction.

10 Claims, 11 Drawing Sheets

DEVICE FOR COLLECTING SWELL ENERGY

CROSS-REFERENCE TO RELATED APPLICATIONS

This application is a U.S. national stage filing under 35 USC §371 of International Patent Application No. PCT/FR2009/000166 filed on Feb. 16, 2009, which claims priority under the Paris Convention to the French Patent Application No. 08 00951, filed on Feb. 22, 2008.

FIELD OF THE DISCLOSURE

The present invention relates to devices for capturing wave energy from the swell.

BACKGROUND OF THE DISCLOSURE

More particularly, the invention relates to a device for capturing wave energy, comprising:
- a float designed to float at the surface of a stretch of water subject to waves, rocking with a rolling movement under the effect of the waves,
- a turbine mounted to rotate about a substantially vertical axis of rotation under the float, said turbine being designed to rock in said rolling movement with said float and to turn about said axis of rotation with respect to the float when said float rocks under the effect of the waves, the turbine comprising at least three concave blades,
- an electric generator driven by the turbine.

Document WO-A-2004/065785 describes a device of this type.

SUMMARY OF THE DISCLOSURE

It is a particular object of the present invention to improve the energy efficiency of devices of this type.

To this end, according to the invention, a device of the kind in question is characterized in that said turbine is shaped so that any rolling movement of the float always results in a torque applied to the turbine in one single same predetermined direction of rotation, and in that the blades of the turbine are in the form of cups (that is to say in the shape of spoons, which are concave both in the direction of the axis of rotation and in the radial direction).

Thanks to the special shape of the turbine, the rolling movements of the float can be put to use to turn the turbine, greatly improving the energy efficiency of the device.

In various embodiments of the device according to the invention, recourse may potentially also be had to one and/or another of the following arrangements:
- the blades of the turbine respectively have concave sides facing substantially orthoradially with respect to the axis of rotation of the turbine, all in an angular direction away from said direction of rotation;
- each blade of the turbine is substantially in the form of a spherical cap;
- the float has a lower part substantially in the shape of a spherical cap;
- the device further comprises a column extending downward along a longitudinal axis from the float, as far as a lower end, said column being connected to the float in such a way that it is subjected to rolling movements when the float rocks at the surface of the water, the turbine being mounted at the lower end of the column and the axis of rotation of the turbine being substantially parallel to the longitudinal axis of the column (it will be noted that the aforementioned column may be a hollow column secured to the float and most often containing a transmission shaft, but this column could if appropriate be reduced to a rotary transmission shaft extending down into the water under the float and carrying the turbine at its lower end);
- the electric generator is contained in the float and is connected to the turbine by a transmission shaft;
- the device further comprises a counterweight that is vertically adjustable with respect to the float;
- the device further comprises means for setting a distance between the float and the turbine;
- the turbine is carried by a transmission shaft which drives the electric generator and which is slidably mounted with respect to the float;
- the turbine comprises a hub that has at least one plate substantially perpendicular to the axis of rotation and fixed to the blades;
- the plate is in the form of a bowl with its concave side facing upward.

BRIEF DESCRIPTION OF THE DRAWINGS

Other features and advantages of the invention will become apparent during the course of the following description of a number of the embodiments thereof, which are given by way of nonlimiting examples with reference to the attached drawings.

In the drawings.

DETAILED DESCRIPTION OF THE DISCLOSURE

In the various figures, the same references denote elements that are identical or similar.

Figure 1:
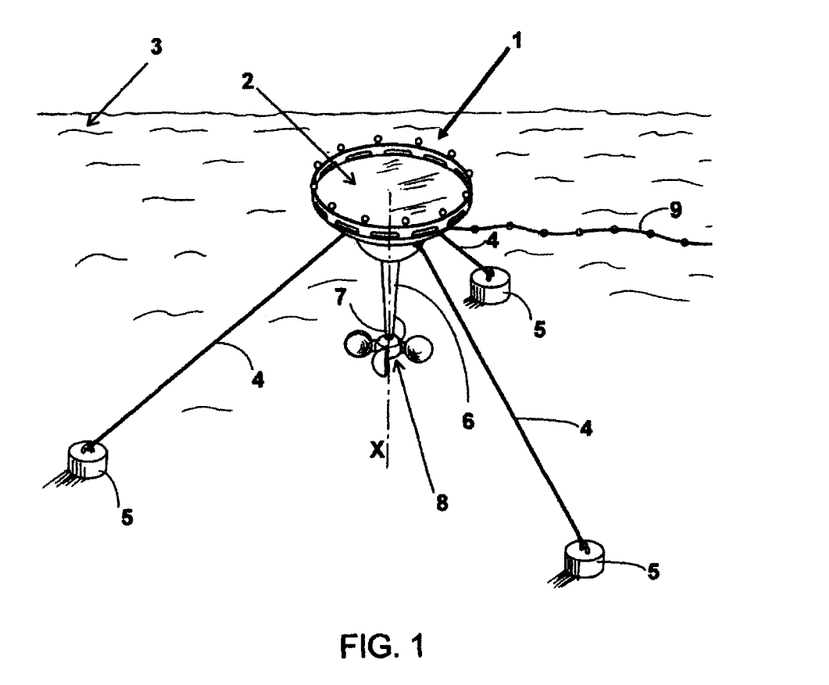
FIG. 1 is a schematic perspective view showing one example of an energy capture device according to a first embodiment of the invention, in the process of being used.

FIG. 1 shows a device 1 for capturing wave energy, according to a first embodiment of the invention. This device 1 comprises a float 2 which floats at the surface of a stretch of water 3 subject to waves and which is held in position for example by a plurality of buoy ropes 4 connected to moorings 5 fixed to the sea bed or estuary floor. The buoy ropes 4, of which there may for example be three distributed at substantially 120° apart, prevent the float 2 from drifting and from turning on itself, but allow it to rock at the surface of the water with a rolling movement, under the effect of the waves. It will be noted that the number of buoy ropes could differ from three and, for example, be two, and that these could potentially be connected to buoys themselves each connected to one or more moorings by one or more other buoy ropes.

The device 1 further comprises a column 6 which is secured to the float 2 and which extends downward along a longitudinal axis X as far as a lower end 7 where a turbine 8 is mounted, able to rotate about the axis X. As will be explained in greater detail hereinafter, the rocking movements of the float 2 and of the column 6 cause the turbine 8 to rotate, which drives an electric generator contained in the float 2. The electrical energy thus produced can be transported ashore for example via an electric cable 9. This electrical energy could potentially be used partly or completely on the float 2, for example if the float 2 is used to carry a light beacon (not depicted) used, for example, for maritime navigation.

Figure 2:
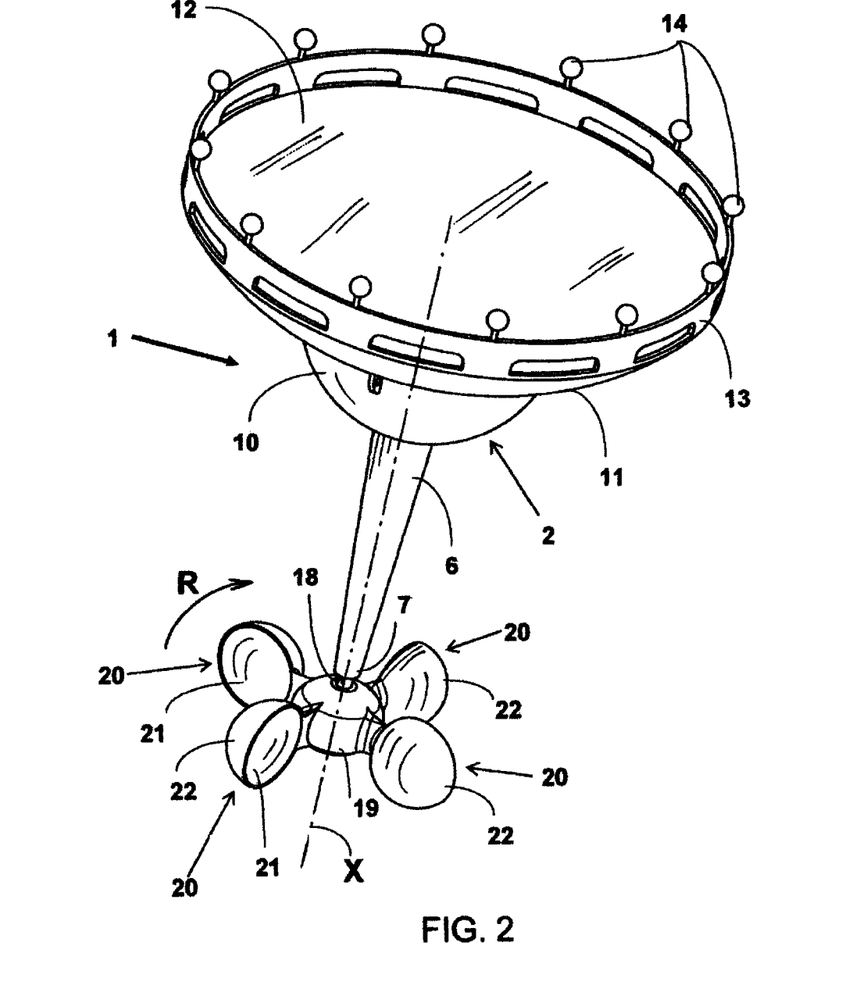
FIG. 2 is an enlarged perspective view of the device of FIG. 1, in a first operating position.
Figure 3:
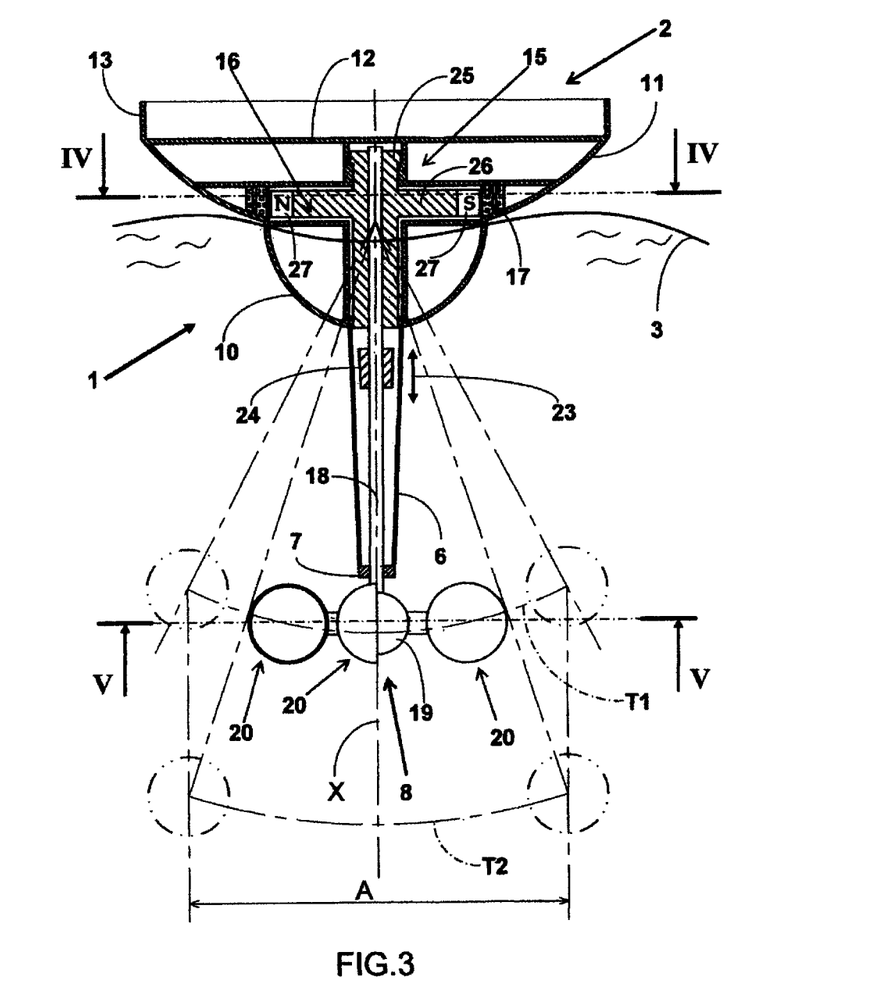
FIG. 3 is a view of the device of FIG. 2, in vertical section.

As depicted in greater detail in FIGS. 2 and 3, the float 2 may for example comprise a lower part 10 in the form of a spherical cap with the concave face facing upward. This lower part 10 may if appropriate have watertight air-filled compartments so as to make the float 2 unsinkable. The lower part 10 is extended upward by a widened upper part 11 which could potentially itself have the shape of a portion of a sphere with the concave side facing upward and with a larger radius than the lower part 10. The upper part 11 of the float thus contributes to returning the float toward its rest position when it experiences rolling movements. As can be seen in FIG. 3, said upper part 11 of the float is at least partially out of the water.

The upper part 11 of the float may be covered by a substantially watertight deck 12, this deck 12 running substantially horizontally when the float is in the rest position. The deck 12 may be surrounded by a guard rail 13 or the like and may be fitted with lighting devices 14 signaling the presence of the float 2 to shipping. If appropriate, the deck 12 may act as a landing pad for a helicopter. The deck 12 may also comprise hatches (not depicted) or other means of access allowing personnel to enter the interior of the float 2.

As depicted in FIG. 3, the float 2 may contain an electric generator 15 comprising, on the one hand, a rotor 16 mounted to rotate about the axis X and, on the other hand, a stator 17 surrounding the rotor 16. The rotor 16 is secured to a transmission shaft 18 which runs along the axis X inside the column 6 as far as the turbine 8 to which it is secured. The lower end 7 of the column 6 forms a watertight bearing preventing water from entering the column 6. Possibly, the rotor could be driven by the turbine 8 via any other transmission device than the shaft 18, for example via a hydraulic transmission device.

The turbine 8 is shaped so that a rocking (rolling) movement of the float 2 and of the column 6 always results in a torque applied to the turbine in one single same predetermined direction of rotation R (see FIG. 2).

By way of example, the turbine 8 may, for example, comprise a hub 19 secured to the transmission shaft 18 and provided with a plurality of concave blades 20 which in this instance are spoon-shaped cups distributed about the axis of rotation and each having a concave face directed orthoradially with respect to the axis of rotation X of the turbine, in the angular direction away from the aforementioned direction of rotation R. There may be at least three of these cups 20 angularly distributed about the axis X.

In the example depicted in the drawings, the turbine 8 comprises four cups 20 arranged 90° apart and each substantially in the shape of a spherical cap, each cup thus having a substantially hemispherical concave interior face 21 and a substantially hemispherical convex exterior face 22. The turbine could possibly, although this is not preferred, have concave blades of shapes other than cup shapes, or more generally have any shape allowing a lateral movement of the turbine always to result in a rotational torque applied to the turbine 8 in the direction R. The turbine 8 may be made of any known material, for example steel, cast iron, or even concrete.

As depicted in FIG. 3, the transmission shaft 18 may, as appropriate, be mounted such that it slides along the axis X with respect to the rotor 16 and to the column 6 in the direction of the double-headed arrow 23, so that the distance between the turbine 8 and the float 2 can be set.

This setting can be adjusted for example using motorized means known per se and not depicted in the drawings, for example a worm-type adjusting system.

It is also possible if appropriate to provide a counterweight 24 in the column 6 (or if appropriate in or on the float 2). This counterweight 24 may be connected to the transmission shaft 18 or to the column 6 itself, and may potentially itself be mounted so that it can slide in the direction of the double-headed arrow 23, so that the height of said counterweight 24 can be set. This setting can be adjusted using adjusting means known per se and not depicted in the drawings, for example a worm-type adjusting system.

Figure 4:
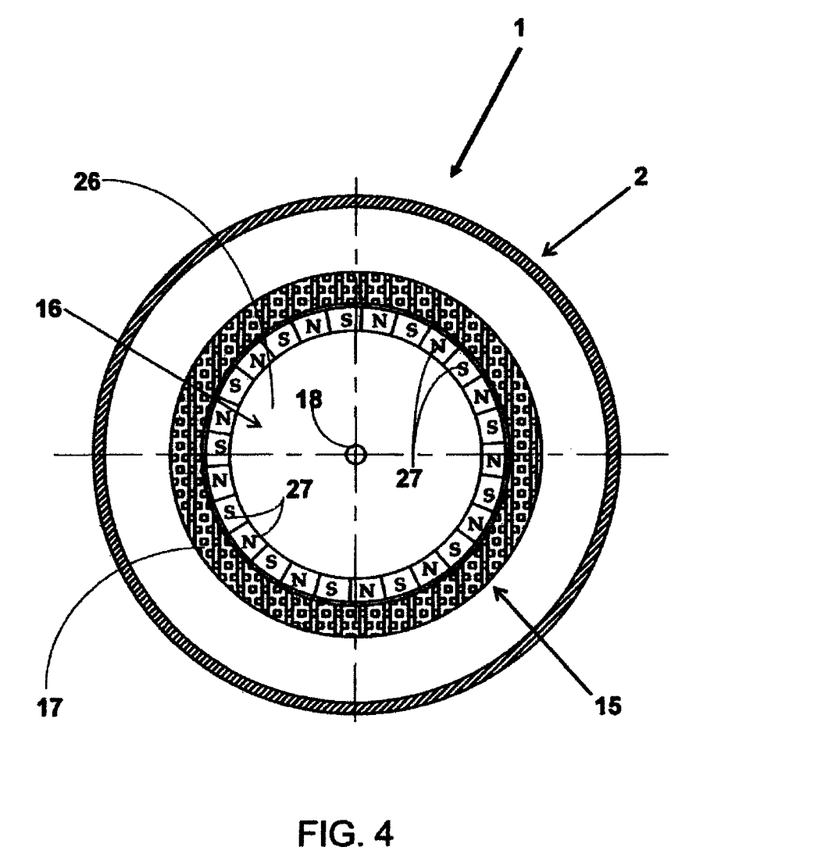
FIG. 4 is a view in section on IV-IV of FIG. 3, FIGS. 5 and 6 are views in section on V-V of FIG. 3, showing the device in the process of operating, showing the effect of the rocking of the column of the device in two opposite directions.

As depicted in FIGS. 3 and 4, the rotor 16 of the electric generator may, if appropriate, have a central hub 25 engaged on the transmission shaft 18 and rotating as one therewith, and a larger-diameter disk which acts as a flywheel, around which magnetic poles 27 are arranged. The magnetic poles 27 may be very numerous so as to allow the electric generator 15 to operate efficiently even at low rotor 16 speeds.

It will be noted that the rotor 16 of the electric generator could also be connected to the transmission shaft 18 (or to any other transmission system connected to the turbine 8) via a one-way drive system (not depicted) that allows the turbine to drive the rotor 16 only in the angular direction R but not to brake the rotor 16. In such instances, the rotor 16 could potentially be coupled to a flywheel (not depicted).

The device that has just been described works as follows.

Figure 5:
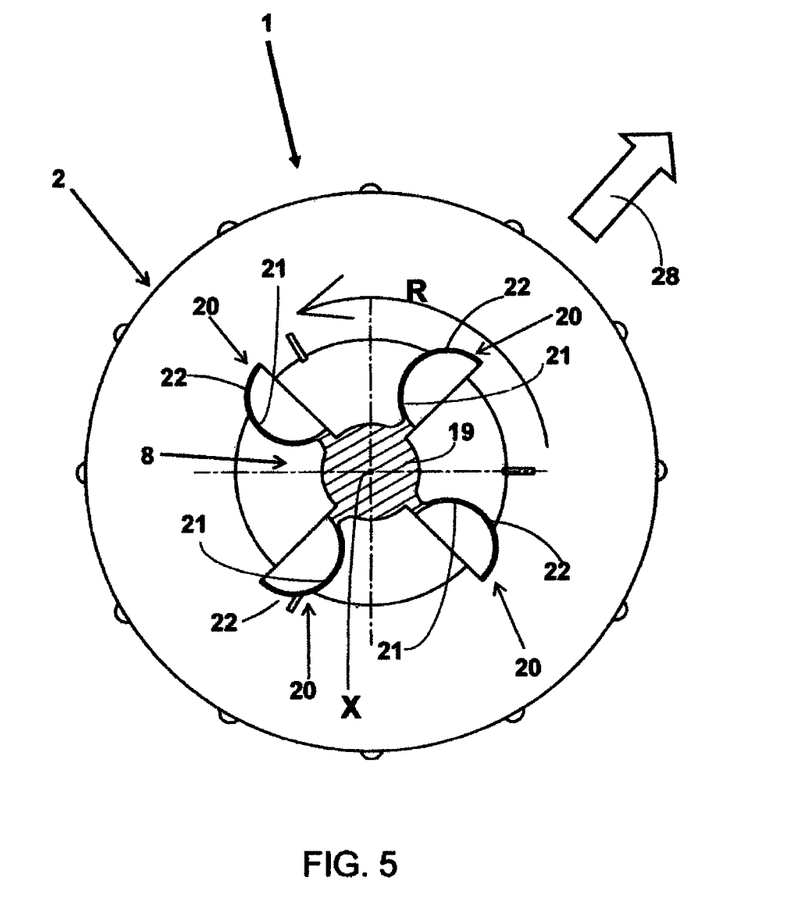
Figure 6:
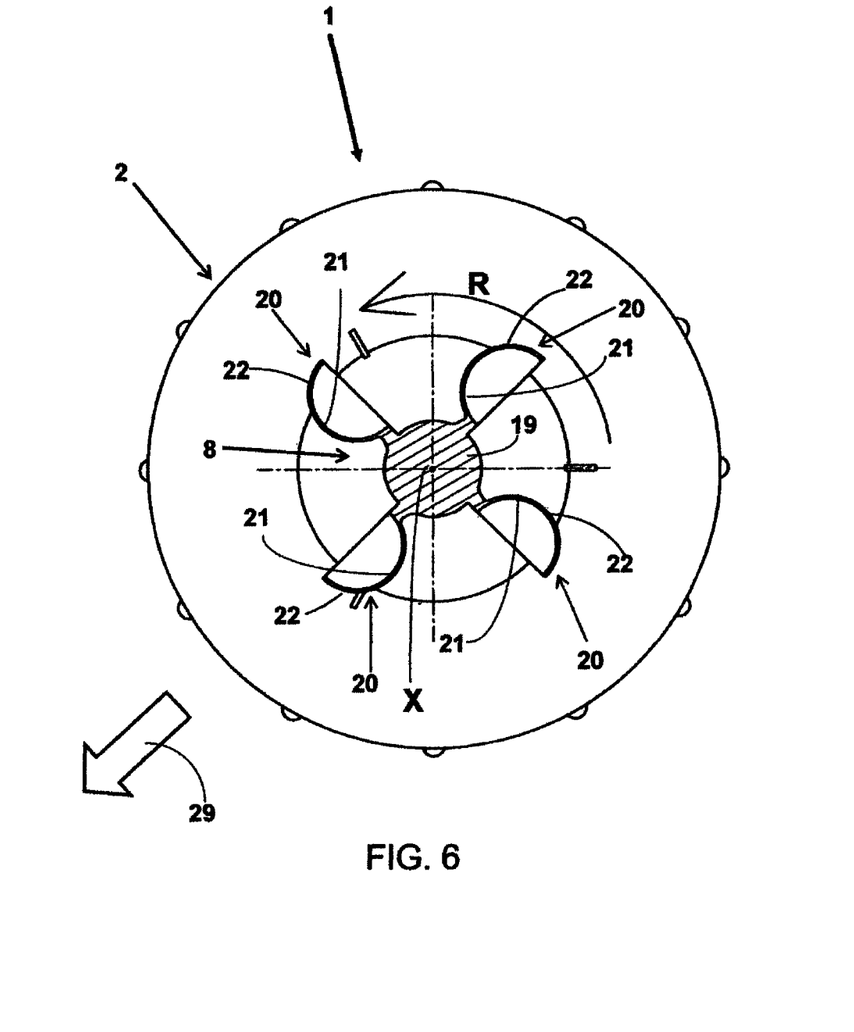

As depicted in FIGS. 5 and 6, the rolling movements of the float 2 result in reciprocating movements of the turbine 8 in random opposite directions 28, 29. Whatever the direction in which the turbine 8 moves, this movement applies a higher force to the concave faces 21 of the cups directed in the direction of travel 28, 29 than it does to the convex faces 22 directed in the same direction, which means that a rotational torque is applied to the turbine 8 always in the direction of rotation R.

It will also be noted that the vertical movements of the turbine 8 in the water also result in a torque being applied to the turbine 8 in the direction of rotation R.

Figure 7:
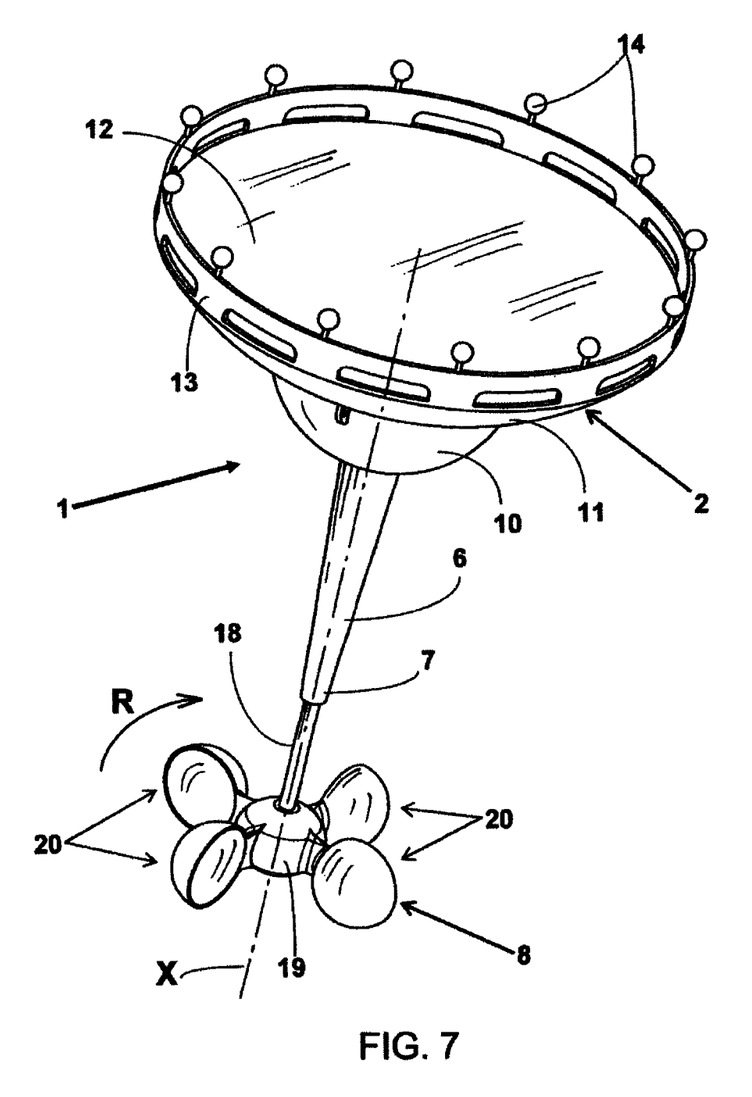
FIG. 7 is a view similar to FIG. 2, showing the energy capture device in a second operating position.

The device can be used with the transmission shaft 18 in the retracted position, as depicted in FIG. 2, when the sea is relatively rough, in which case the rolling movements of the float 2 generate a certain amplitude of movement A of the turbine 8, which then moves over paths similar to the path T1 depicted in FIG. 3. When the sea is more calm, it is possible to lower the turbine 8 by sliding the transmission shaft 18 downward, as depicted in FIG. 7, in which case the turbine 8 moves over paths similar to the path T2 of FIG. 3, making it possible once again to obtain a relatively large amplitude A of movement of the turbine 8 (FIG. 3).

While the device 1 is in use, it is also possible to shift its center of gravity by moving the counterweight 24, so as to alter the natural frequency of oscillation of the device 1, in order to bring this natural frequency close to the frequency of oscillation of the turbine 8 as imposed by the waves.

Finally, it will be noted that the presence of the disk 26 of the rotor 16 and/or the use of a heavy turbine 8 means that the movements of the turbine 8 and of the rotor 16 can be evened out. It may also result in the turbine 8 describing an elliptical path during the rocking movements of the float 2, through a gyroscopic effect, and this is advantageous for the driving of the turbine 8.

The second and third embodiments of the invention which have been depicted in FIGS. 8 to 11 are similar to the first embodiment described hereinabove and will not be described in detail again; only the ways in which these second and third embodiments differ from the first embodiment will be described.

Figure 8:
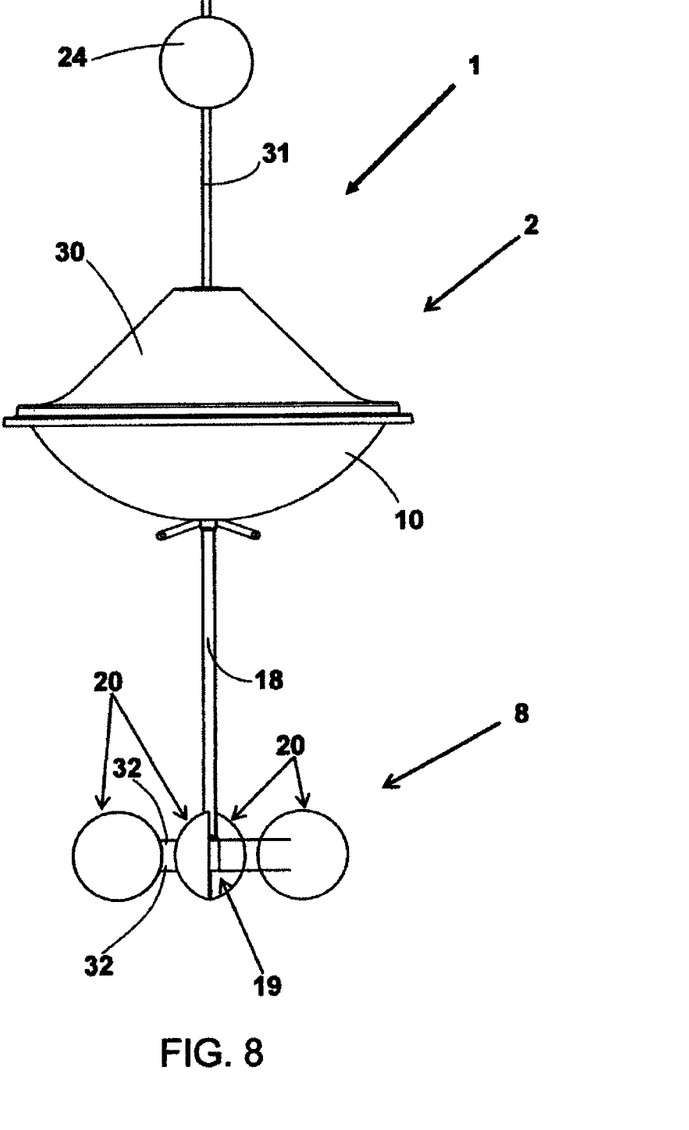
FIG. 8 is a side view of one example of an energy capture device according to a second embodiment of the invention.
Figure 9:
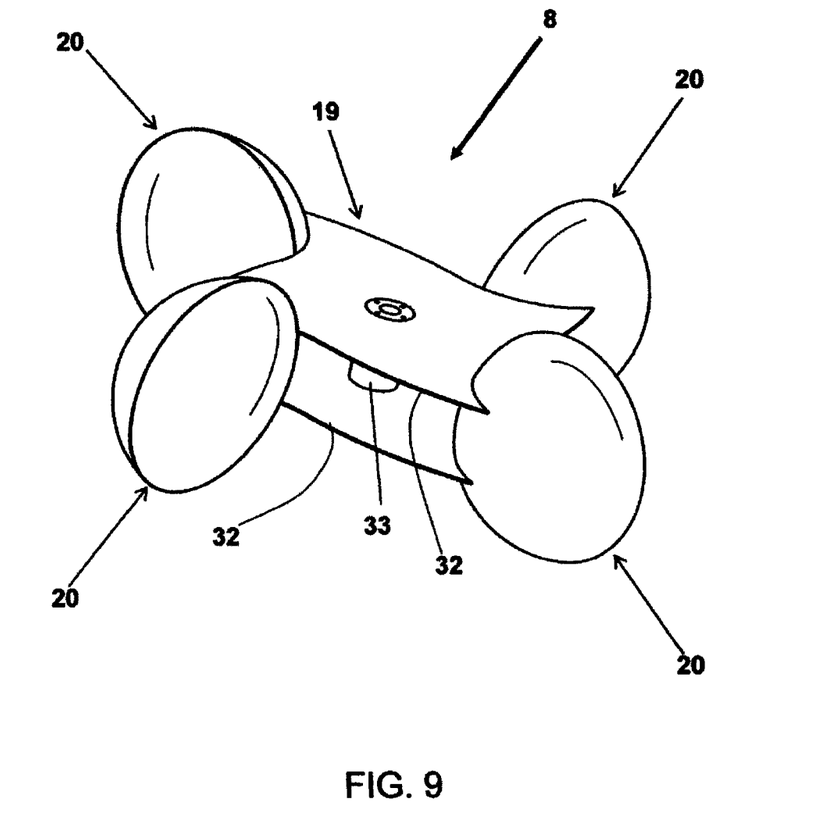
FIG. 9 is a perspective view of the turbine of the device of FIG. 8.

The second embodiment, depicted in FIGS. 8 and 9, differs from the first embodiment as follows:

- the lower part of the float here consists entirely of the spherical cap-shaped part 10, so as to encourage rolling movements (of course, this shape of float could just as easily be used in the first embodiment of the invention, and other float shapes could equally be used in all the embodiments of the invention, for example a shape of float in which the lower part is in the shape of a portion of a cylinder so as to encourage rolling movements in one direction);
- the device has no column 6 under the float, the shaft 18 emerging directly under the float 2 (the turbine is, however, some distance from the float 2, for example several meters under the float, as in the first embodiment);
- the upper part 30 of the float is a frustoconical shape (as an alternative, this upper part could consist of a flat deck as in the first embodiment, and the frustoconical upper part 30 of the second embodiment could also be used in the first embodiment);
- the float 2 is surmounted by a vertical mast 31 carrying a counterweight 24 similar to that of the first embodiment, it potentially being possible for the position of this counterweight 24 to be adjusted along the length of the mast 31 using motorized or unmotorized means (the mast 31 fitted with the counterweight 24 could also be used in the first embodiment as an alternative to or to supplement the counterweight 24 mounted on the shaft 18 of the turbine; likewise, the device according to the second embodiment could be fitted with a counterweight 24 mounted along its shaft 18 as an alternative to or to supplement the counterweight 24 mounted on the mast 31);
- the hub 19 of the turbine 8 is here formed of at least one sheet metal plate, for example two sheet metal plates 32 running perpendicular to the axis of rotation X; these sheet metal plates 32 are fixed to the rear (extrados) faces of the blades 20, by welding or some other means, said sheet metal plates 32 for example perhaps being secured to a central sleeve 33 centered on the axis X, which is pushed onto the lower end of the shaft 18 and attached thereto.

Figure 10:
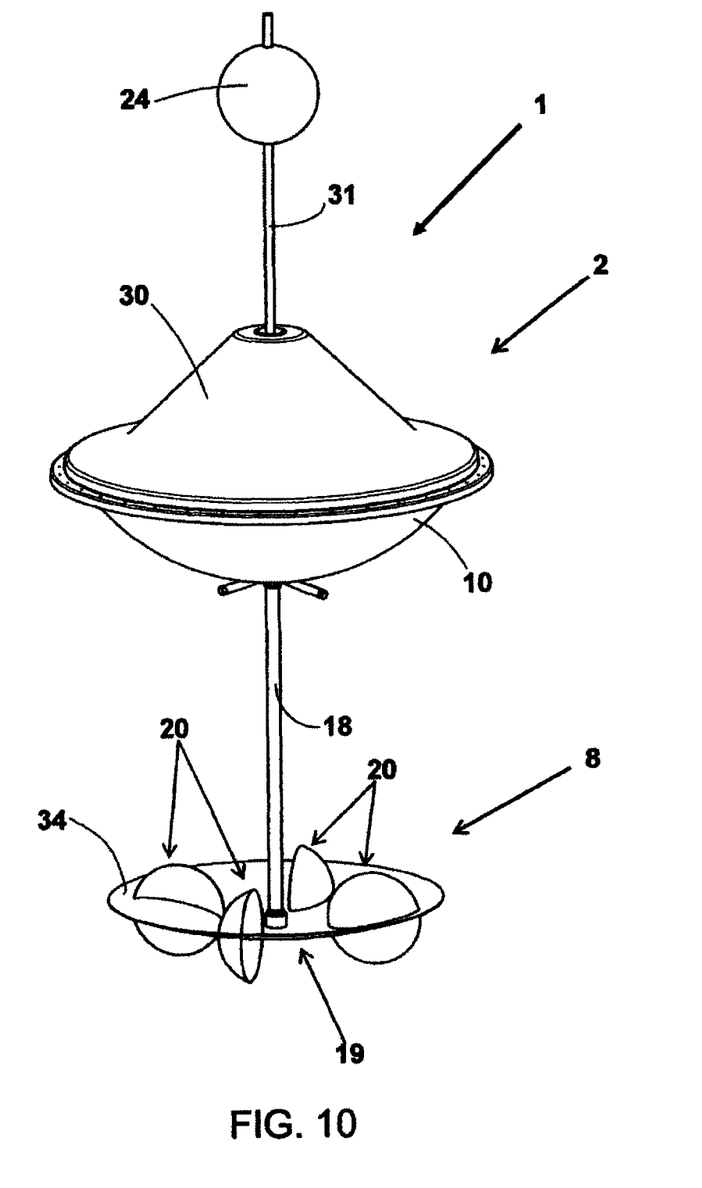
FIG. 10 is a perspective view of one example of an energy capture device according to a third embodiment of the invention.
Figure 11:
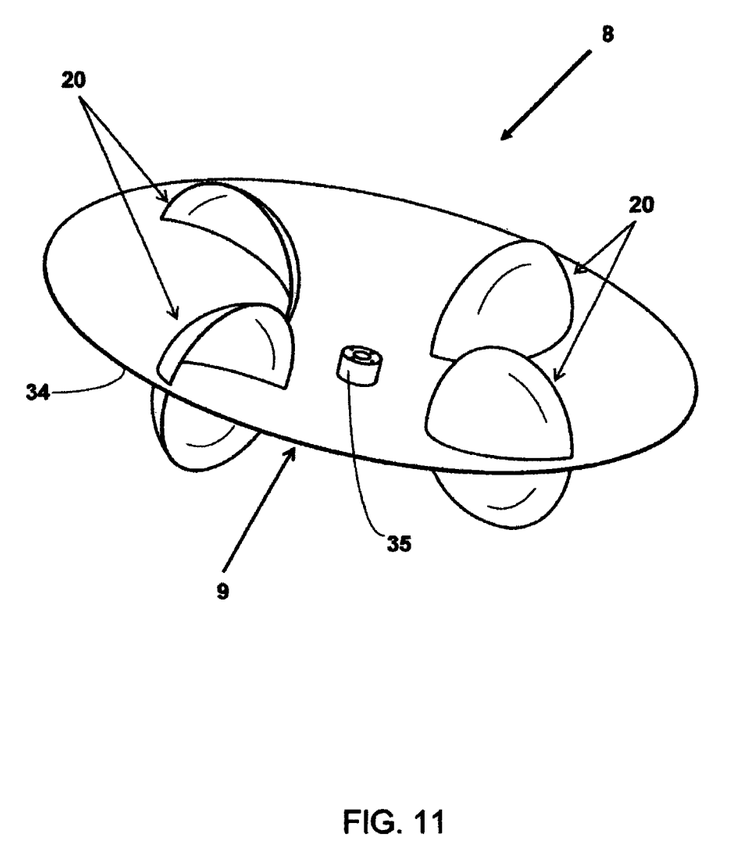
FIG. 11 is a perspective view of the turbine of the device of FIG. 10.

The third embodiment of the invention depicted in FIGS. 10 and 11 is an alternative form of the second embodiment and differs from this second embodiment only in the shape of the hub 19 of the turbine 8. In the third embodiment, the hub 19 comprises a sheet metal plate 34 (or, if appropriate, several sheet metal plates) in the shape of a bowl exhibiting symmetry of revolution about the axis X, with the concave side advantageously facing upward to slow the upward return movements of the float 2 through the water. This sheet metal plate 34 is connected to the shaft 18 for example by means of a sleeve 35 similar to that of the second embodiment.

It will be noted that the turbines of the second and third embodiments of the invention could each be used in the first embodiment and, conversely, the turbine of the first embodiment could be used in the second and third embodiments.

The invention claimed is:

1. A device for capturing wave energy, comprising:
   a float floating in a surface of a stretch of water subject to waves, said float being fixed in a substantially fixed place so as to prevent said float from drifting and from turning on itself, and so as to enable said float to rock with tilting movements under effect of the waves;
   a column rigid with the float and extending downward from the float, as far as a lower end,
   a turbine pivotally mounted at the lower end of the column around a substantially vertical axis of rotation, said turbine being designed so that any tilting movement of the float always results in a torque applied to the turbine in one single same predetermined direction of rotation to rock in said tilting movement with said float and to turn about said axis of rotation with respect to the float when said float rocks under effect of the waves; and
   an electric generator driven by the turbine.

2. The device as claimed in claim 1, in which the turbine has at least three blades respectively having concave faces facing substantially orthoradially with respect to the axis of rotation of the turbine, all in an angular direction away from said direction of rotation.

3. The device as claimed in claim 2, in which each blade of the turbine is substantially in the form of a spherical cap.

4. The device as claimed in claim 1, in which the float has a lower part substantially in the shape of a spherical cap.

5. The device as claimed in claim 1, in which the electric generator is contained in the float and is connected to the turbine by a transmission shaft.

6. The device as claimed in claim 1, in which the device further comprises a counter weight that is vertically adjustable with respect to the float.

7. The device as claimed in claim 1, in which the device further comprises means for setting a distance between the float and the turbine.

8. The device as claimed in claim 2, in which the turbine comprises a hub that has at least one plate substantially perpendicular to the axis of rotation and fixed to the blades.

9. The device as claimed in claim 8, in which the plate is in the form of a bowl with its concave side facing upward.

10. A method for capturing wave energy, the method comprising:
   providing a device comprising:
      a float;
      a column rigid with the float, and extending downward from the float, as far as a lower end;
      a turbine rotatively mounted at the lower end of the column and having a substantially vertical axis of rotation, said turbine being shaped so that any tilting movement of the float always results in a torque applied to the turbine in one single same predetermined direction of rotation; and
      an electric generator driven by the turbine;
   fixing said float in a substantially fixed place in surface of a stretch of water subject to waves, said float being fixed so as to prevent said float from drifting and from turning on itself, and so as to enable said float to rock with tilting movements under effect of the waves; and rotating the turbine always in said predetermined direction of rotation under effect of the tilting movements of the float.

* * * * *